(12) United States Patent
Hoffmuller et al.

(10) Patent No.: US 7,667,894 B2
(45) Date of Patent: Feb. 23, 2010

(54) SECURITY ELEMENT AND PROCESS FOR PRODUCING THE SAME

(75) Inventors: Winfried Hoffmuller, Bad Tolz (DE); Theodor Burchard, Gmund (DE)

(73) Assignee: Giesecke & Devrient GmbH, Munich (DE)

( * ) Notice: Subject to any disclaimer, the term of this patent is extended or adjusted under 35 U.S.C. 154(b) by 438 days.

(21) Appl. No.: 11/568,386

(22) PCT Filed: Apr. 29, 2005

(86) PCT No.: PCT/EP2005/004673

§ 371 (c)(1),
(2), (4) Date: Oct. 26, 2006

(87) PCT Pub. No.: WO2005/105473

PCT Pub. Date: Nov. 10, 2005

(65) Prior Publication Data

US 2007/0229928 A1    Oct. 4, 2007

(30) Foreign Application Priority Data

Apr. 30, 2004   (DE) .................. 10 2004 021 247

(51) Int. Cl.
*G02B 5/30* (2006.01)
(52) U.S. Cl. ...................... 359/490; 359/502
(58) Field of Classification Search .............. None
See application file for complete search history.

(56) References Cited

U.S. PATENT DOCUMENTS

| | | | |
|---|---|---|---|
| 3,836,230 A * | 9/1974 | Adams et al. | 349/176 |
| 5,678,863 A | 10/1997 | Knight et al. | |
| 6,570,648 B1 | 5/2003 | Muller-Rees et al. | |
| 7,401,817 B2 | 7/2008 | Muller-Rees et al. | |

(Continued)

FOREIGN PATENT DOCUMENTS

DE    10044465    3/2002

(Continued)

OTHER PUBLICATIONS

International Search Report, International Application No. PCT/EP2005/004673, 4 pages, Aug. 4, 2005.

(Continued)

*Primary Examiner*—Arnel C Lavarias
(74) *Attorney, Agent, or Firm*—Greenlee, Winner and Sullivan, P.C.

(57) ABSTRACT

A security element for securing value documents has a first light-polarizing layer that is present at least in some areas and includes a cholesteric liquid crystal material, that selectively reflects light having a predetermined circular polarization, and that selectively reflects light of a firs wavelength range in a first reflection direction and light of a second wavelength range having a second, different reflection direction. A second light-polarizing layer is present at least in some areas and selectively reflects light having the opposite circular polarization to the predetermined circular polarization and selectively reflects light of the first and second wavelength range in the first and second reflection direction, respectively. A semi-transparent filter layer on which the first and second light-polarizing layer are stacked, absorbs light from the visible spectral range and transmits light from the first and/or second wavelength range.

47 Claims, 5 Drawing Sheets

U.S. PATENT DOCUMENTS

Figure 1:
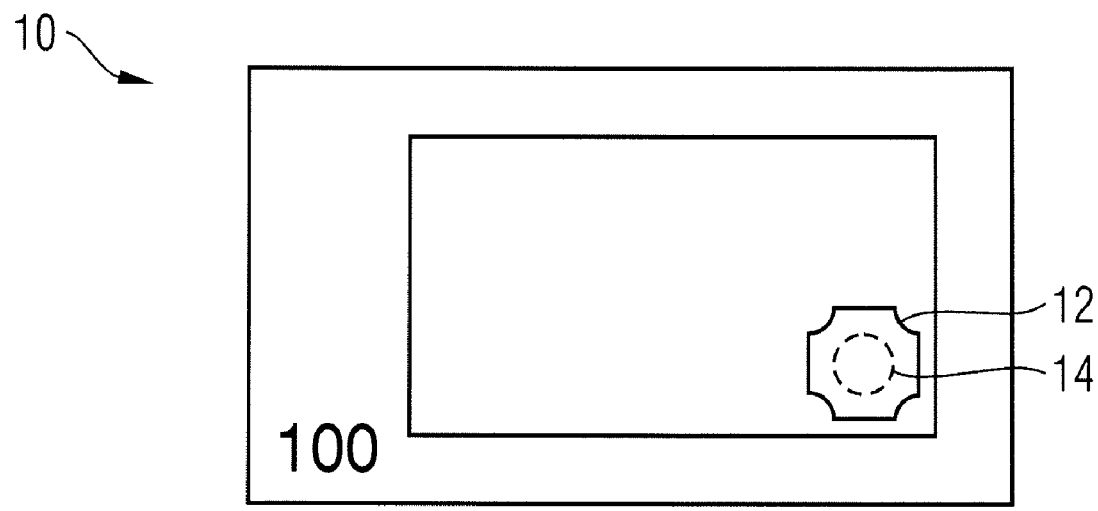

| | | |
|---|---|---|
| 2002/0089623 A1* | 7/2002 | Moon et al. .................... 349/98 |
| 2003/0012935 A1 | 1/2003 | Kuntz et al. |
| 2003/0179363 A1 | 9/2003 | Wang et al. |
| 2004/0008302 A1* | 1/2004 | Moon ......................... 349/115 |
| 2005/0151896 A1* | 7/2005 | Hara et al. .................... 349/96 |
| 2006/0171030 A1* | 8/2006 | Umeya ....................... 359/502 |
| 2007/0008460 A1* | 1/2007 | Takeda et al. ................. 349/98 |
| 2007/0159671 A1* | 7/2007 | Hoshino et al. ................. 359/2 |
| 2007/0165182 A1 | 7/2007 | Hoffmuller et al. |
| 2007/0211238 A1 | 9/2007 | Hoffmuller et al. |
| 2007/0216518 A1 | 9/2007 | Hoffmuller |
| 2007/0229928 A1 | 10/2007 | Hoffmuller et al. |
| 2007/0241553 A1 | 10/2007 | Heim |
| 2007/0246933 A1 | 10/2007 | Heim |
| 2007/0274559 A1 | 11/2007 | Depta |
| 2008/0014378 A1 | 1/2008 | Hoffmuller |
| 2008/0054621 A1 | 3/2008 | Burchard et al. |
| 2008/0079257 A1 | 4/2008 | Fessl |
| 2008/0088859 A1 | 4/2008 | Depta |
| 2008/0160226 A1 | 7/2008 | Kaule |
| 2008/0163994 A1 | 7/2008 | Hoppe |
| 2008/0198468 A1 | 8/2008 | Kaule |
| 2008/0216976 A1 | 9/2008 | Ruck |
| 2008/0250954 A1 | 10/2008 | Depta |
| 2008/0258456 A1 | 10/2008 | Rahm |
| 2009/0001709 A1 | 1/2009 | Kretschmar |
| 2009/0008923 A1 | 1/2009 | Kaule |
| 2009/0008926 A1 | 1/2009 | Depta |
| 2009/0102605 A1 | 4/2009 | Kaule |
| 2009/0115185 A1 | 5/2009 | Hoffmuller |

FOREIGN PATENT DOCUMENTS

| | | |
|---|---|---|
| DE | 10243650 | 4/2004 |
| EP | 0435029 | 7/1991 |
| EP | 0899119 A1 | 3/1999 |
| EP | 1120737 | 8/2001 |
| EP | 1156934 | 7/2003 |
| EP | 1381022 | 1/2004 |
| EP | 0911758 | 11/2005 |
| GB | 2276883 | 10/1994 |
| GB | 2282145 | 3/1995 |
| WO | WO 98/52077 | 11/1998 |
| WO | WO 00/50249 | 8/2000 |
| WO | WO 01/55960 | 8/2001 |
| WO | WO 02/061470 | 8/2002 |
| WO | WO 03/006261 | 1/2003 |
| WO | WO 2004/028824 | 4/2004 |
| WO | WO 2005/101101 | 10/2005 |
| WO | WO 2005105473 | 11/2005 |
| WO | WO 2005105474 | 11/2005 |
| WO | WO 2005105475 | 11/2005 |
| WO | WO 2005108106 | 11/2005 |
| WO | WO 2005108108 | 11/2005 |
| WO | WO 2005108110 | 11/2005 |
| WO | WO 2006005434 | 1/2006 |
| WO | WO 2006015733 | 2/2006 |
| WO | WO 2006018171 | 2/2006 |
| WO | WO 2006018172 | 2/2006 |
| WO | WO 2006040069 | 4/2006 |
| WO | WO 2006056342 | 6/2006 |
| WO | WO 2006072380 | 7/2006 |
| WO | WO 2006087138 | 8/2006 |
| WO | WO 2006099971 | 9/2006 |
| WO | WO 2006119896 | 11/2006 |
| WO | WO 2006128607 | 12/2006 |
| WO | WO 2007006445 | 1/2007 |
| WO | WO 2007006455 | 1/2007 |
| WO | WO 2007076952 | 7/2007 |
| WO | WO 2007079851 | 7/2007 |
| WO | WO 2007115648 | 10/2007 |

OTHER PUBLICATIONS

International Preliminary Report on Patentability, International Application No. PCT/EP2006/001169, 5 pages.
International Search Report, International Application No. PCT/EP2005/004683, 6 pages, Dec. 6, 2005.
International Preliminary Report on Patentability, English Translation, International Application No. PCT/EP2005/004683, 14 pages.
U.S. Appl. No. 11/568,538, filed Sep. 23, 2008, Depta.
U.S. Appl. No. 11/719,843, Kaule.
U.S. Appl. No. 11/909,115, filed Sep. 19, 2007, Kretschmar.
U.S. Appl. No. 11/995,227, Gruszczynski.
U.S. Appl. No. 12/097,834, filed Jun. 17, 2008, Kaule.
U.S. Appl. No. 12/294,222, Hoffmuller.

* cited by examiner

SECURITY ELEMENT AND PROCESS FOR PRODUCING THE SAME

CROSS-REFERENCE TO RELATED APPLICATIONS

This application is the National Stage of International Application No. PCT/EP2005/04673, filed Apr. 29, 2005, which claims the benefit of German Patent Application DE 10 2004 021 247.3, filed Apr. 30, 2004, both of which are hereby incorporated by reference to the extent not inconsistent with the disclosure herewith.

The present invention relates to a security element for securing value documents having one or more liquid crystal layers. The present invention further relates to a method for manufacturing such a security element, a security arrangement that comprises, in addition to such a security element, a separate display element, and a value document that is furnished with such a security element or such a security arrangement.

For protection, value documents are often equipped with security elements that permit the authenticity of the document to be verified, and that simultaneously serve as protection against unauthorized reproduction. This can be, for example, a printed security paper, an identification card comprising plastic, or another document requiring protection.

Optically variable elements that, at different viewing angles, give the viewer a different image impression, for example a different color impression, are often used as security elements. From publication EP 0 435 029 A2 is known such a security element having a plastic-like layer comprising a liquid crystal polymer, which layer shows a marked play of changing colors at room temperature. It is possible to combine the optically variable effects of the liquid crystal polymers by coloring any layers with conventional inks, allowing patterns to be produced that become visible only when the security elements are tilted. The dyes themselves can be introduced in any layer or applied as a print image.

From publication EP 1 156 934 B1 is known a security element having a liquid crystal layer as the optically variable material. Described is an exemplary embodiment having an arrangement of register-maintaining printing layers comprising right-handed and left-handed liquid crystal material, which layers display the same appearance under normal illumination, such that a piece of information depicted by the shape or the outline of the areas cannot be perceived. Only when the layers are viewed through a suitable polarization filter can the piece of information be perceived, due to the difference in brightness between the printing layers. To achieve this effect, however, a register-accurate application of the liquid crystal layers is necessary.

In the security elements described, due to the physical properties, the color-shift effect of the liquid crystal layers always causes a shift in the reflected light wavelength from the longer-wave range to a shorter-wave range when the security element is tilted out of the vertical viewing direction. The options for producing different color-shift effects are thus limited. Furthermore, the liquid crystal layers act as a security element only when viewed in reflection, since the color-shift effect cannot be observed in transmitted light due to the required dark or black background.

Based on that, the object of the present invention is to specify a security element of the kind cited above having high counterfeit security, and that avoids the disadvantages of the background art.

This object is solved by the security element having the features of the main claim. A method for its manufacture, a security arrangement and a value document having such a security element are specified in the coordinated claims. Developments of the present invention are the subject of the dependent claims.

The present invention provides, for protecting value documents, a security element that includes a first light-polarizing layer that is present at least in some areas and comprises a cholesteric liquid crystal material, that selectively reflects light having a predetermined circular polarization, and that selectively reflects light of a first wavelength range in a first reflection direction and light of a second wavelength range in a second, different reflection direction. The security element further includes a second light-polarizing layer that is present at least in some areas and selectively reflects light having the opposite circular polarization to the predetermined circular polarization, and that selectively reflects light of the first and second wavelength range in the first and second reflection direction, respectively, and a semi-transparent filter layer on which the first and second light-polarizing layer are stacked. Here, the filter layer at least partially absorbs light from the visible spectral range and transmits light from the first and/or second wavelength range.

Such a design makes it possible to achieve novel liquid crystal effects having increased counterfeit security. As explained in detail below, through the interplay of the semi-transparent filter layer with two or three coordinated liquid crystal layers, semi-transparent security elements having an inverse color-shift effect can be produced in which the color impression of the security element, unlike in conventional color-shift elements, changes from short-wave to a longer-wave color impression when tilted out of the vertical.

In a first advantageous variant of the present invention, the second light-polarizing layer is formed from a cholesteric liquid crystal material and selectively reflects light having the opposite circular polarization to the predetermined circular polarization.

Alternatively, the second light-polarizing layer can be formed from two sub-layers, a first sub-layer being formed from a cholesteric liquid crystal material and selectively reflecting light having the predetermined circular polarization, and a second sub-layer that is disposed between the first sub-layer and the first light-polarizing layer forming a $\lambda/2$ layer. Here, the $\lambda/2$ layer is preferably formed from a nematic liquid crystal material that facilitates the manufacture of optically active layers due to the optical anisotropy of the aligned rod-shaped liquid crystals.

To weaken the effect of the $\lambda/2$ layer in some regions and/or to produce new effects, the $\lambda/2$ layer can also be formed from multiple sub-layers that are stacked and, in some areas, twisted toward one another in the layer plane. Here, the sub-layers are particularly advantageously formed by two $\lambda/4$ layers. Through different twisting of the two $\lambda/4$ sub-layers in some areas, their influence on circularly polarized light can be systematically controlled to produce, for example, encoded halftone images.

In a preferred embodiment, the first and second light-polarizing layer can selectively reflect light of a third wavelength range in a third reflection direction. Here, the semi-transparent filter layer at least partially absorbs light from the visible spectral range and transmits light from the first and/or second and/or third wavelength range.

In a preferred embodiment, the first and second light-polarizing layer reflect light from the visible spectral range in all reflection directions. In other, likewise advantageous embodiments, the two light-polarizing layers reflect, at least in one of the reflection directions, light from the non-visible spectral range, especially infrared or ultraviolet radiation.

The reflection in the non-visible spectral range can be used, for example, for machine-readable authenticity features or for color-shift effects in which a visible color impression appears or disappears when tilted.

The first and second and, if applicable, the third reflection direction can be chosen freely. To be able to visually separate the different color impressions of the two wavelength ranges well, the first and second and, if applicable, the third reflection direction are preferably separated by a polar angle of 20° or more with respect to a surface normal to the light-polarizing layers. Particularly preferably, the first and second reflection direction are separated by a polar angle of 40° or more with respect to a surface normal to the light-polarizing layers. For example, the first reflection direction can be parallel to the surface normal (polar angle $\theta=0°$) and the second reflection direction can include an angle of 45° with the first reflection direction (polar angle $\theta=45°$).

In all embodiments, the different layers of the security element can be present in the form of characters and/or patterns. Also, further layers comprising nematic and/or cholesteric liquid crystal material can be provided. At least one of the light-polarizing layers comprising cholesteric liquid crystal material and/or, if applicable, at least one layer comprising nematic liquid crystal material is expediently present in the form of pigments that are embedded in a binder matrix. Such pigments are easier to print than liquid crystals from solution and do not place such high demands on the smoothness of the background. Furthermore, the pigment-based printing inks need no alignment-promoting actions.

In an advantageous embodiment, the first and second light-polarizing layer can both be formed from cholesteric liquid crystal material and be present in the form of pigments. Here, a mixture of equal parts of pigments of the first and second light-polarizing layer is expediently embedded in a binder matrix. In this way, it is possible to apply the first and second light-polarizing layer, which together form a band-stop filter, in one printing process as one layer.

Preferably, the semi-transparent filter layer transmits light between the first and second and, if applicable, the third wavelength range and absorbs visible light outside of the two wavelength ranges. The light transmitted through the security element is then controlled substantially only by the liquid crystal layers such that intensive and high-contrast transmitted light color effects can be produced.

It can also be provided that the semi-transparent filter layer transmits only light of the first and/or second and/or third wavelength range and absorbs visible light outside of the first and/or second and/or third wavelength range. In this way, security elements can be created in which, when tilted, one or more visible color impressions disappear and become dark viewing areas.

In advantageous embodiments of the present invention, the semi-transparent filter layer is formed by a foil or lacquer layer colored with dyes. In the latter case, the lacquer layer can be applied on a transparent and colorless substrate foil. Like the light-polarizing layers, the semi-transparent filter layer can alternatively or additionally be present in the form of characters and/or patterns.

The light-polarizing layers and the semi-transparent filter layer can be present on a substrate that is advantageously formed from paper or plastic. Alignment layers and/or adhesive layers intended to align liquid crystal layers can be present between adjacent light-polarizing layers and/or a light-polarizing layer and the semi-transparent filter layer.

In advantageous embodiments, the security element forms a label or a transfer element.

The present invention also comprises a method for manufacturing a security element of the kind described, in which a first light-polarizing layer comprising a cholesteric liquid crystal material and a second light-polarizing layer that includes at least one (sub-)layer comprising a cholesteric liquid crystal material are stacked on a semi-transparent filter layer. Here, advantageously, one or more of the liquid crystal layers are applied to, especially imprinted on, a substrate foil. If different liquid crystal layers are applied to separate substrate foils, then, following the application to the substrate foil, they can each be checked for suitability for further processing and, if applicable, eliminated. Alternatively, two or more liquid crystal layers can be applied stacked on the same substrate foil.

The liquid crystal material can be applied from a solvent or from the melt. Furthermore, especially cholesteric liquid crystal material in paste-like form can be applied as a UV-curing cholesteric mixture, such a system neither including typical solvents nor being based on a melt or pigments, but rather including further UV-curing lacquers. Depending on the method applied, to remove the solvent, the liquid crystal material is subsequently physically dried, aligned and cured. The alignment can be done directly by the substrate foil or by so-called alignment layers, by applying shear forces, with the aid of electrostatic methods, etc. To cure the liquid crystal material, it can be crosslinked, for example by means of ultraviolet radiation or by means of electron beam (EBC). However, the liquid crystal material can also be set by adding certain additives.

In an expedient embodiment of the method, the liquid crystal layers present on a substrate foil are laminated onto the semi-transparent filter layer or a further liquid crystal layer. Following lamination, the substrate foil can be removed, especially via separation layers or by using a laminating adhesive whose adhesion to the substrate foil is less than its adhesion to the liquid crystal layer. These requirements for the laminating adhesive are especially important when the liquid crystal layer to be transferred is not formed contiguously.

Alternatively, to facilitate separation, to the liquid crystal layer present on the substrate foil can be applied a contiguous auxiliary layer whose adhesion to the substrate foil is less than its adhesion with respect to the liquid crystal layer. In this way, the laminating adhesive can be applied contiguously, and uncontrolled sticking is simultaneously prevented. Here, the auxiliary layer is advantageously a UV lacquer layer.

Advantageously, the formation of the cholesteric liquid crystal layers can happen by combining a nematic liquid crystal system with a twister. Here, the two cholesteric liquid crystal layers can be formed by combining a nematic liquid crystal system with coordinated first and second twisters, such that the liquid crystals of the first and second layer arrange themselves into mirror-image helix structures.

The $\lambda/2$ sub-layer of the second light-polarizing layer formed from two sub-layers is expediently formed from a nematic liquid crystal material.

The present invention further includes a security arrangement for security papers, value documents and the like, having a security element of the kind described or a security element manufacturable according to the described method, and a separate display element that, in coaction with the security element, makes a color-shift effect and/or a polarization effect perceptible for the viewer. In a preferred embodiment, the display element comprises a dark, preferably black background that can also be present in the form of characters and/or patterns. In another, likewise preferred embodiment, the display element can also comprise a linear or circular polarizer.

The present invention further comprises a value document having a security element or a security arrangement of the kind described. Here, the security element is advantageously disposed in a window area of the value document, so in a transparent or at least translucent area of the value document, or over an opening that has been diecut or produced with papermaking technology. In the context of the present description, the term "transparency" refers here to the complete transparency of a material, and "translucent" means sheer in the sense of a certain transmittance, i.e. the material exhibits especially a transmittance of less than 90%, mostly between 80% and 20%. It is only essential that light be able to pass through to the reverse of the security element such that it can be viewed in transmitted light. Particularly preferably, the value document is formed to be flexible such that the security element and the display element can be laid one on top of another by bending or folding the value document for self-authentication.

Value documents within the meaning of the present invention thus include especially banknotes, stocks, identity cards, credit cards, bonds, certificates, vouchers, checks, valuable admission tickets and other papers that are at risk of counterfeiting, such as passports and other identity documents. In the following, the term "value document" encompasses all such documents. The term "security paper" is understood to be the not-yet-circulatable precursor to a value document, which precursor can exhibit, in addition to the security element, further authenticating features, such as luminescent substances provided in the volume. Security paper is customarily present in quasi-endless form and is further processed at a later time.

In a method for checking the authenticity of a security element, security arrangement or value document of the kind described above, it is checked in transmitted light whether a predetermined color-shift effect is present and the authenticity of the checked element is assessed on the basis of the check result. In a further check method, the security element is laid on a dark background, formed, if applicable, by the display element. A piece of information encoded in the security element is then read with the aid of a circular polarizer, and the authenticity of the checked element assessed on the basis of the read result.

Further exemplary embodiments and advantages of the present invention are explained below by reference to the drawings, in which a depiction to scale and proportion was omitted in order to improve their clarity.

Figure 2:
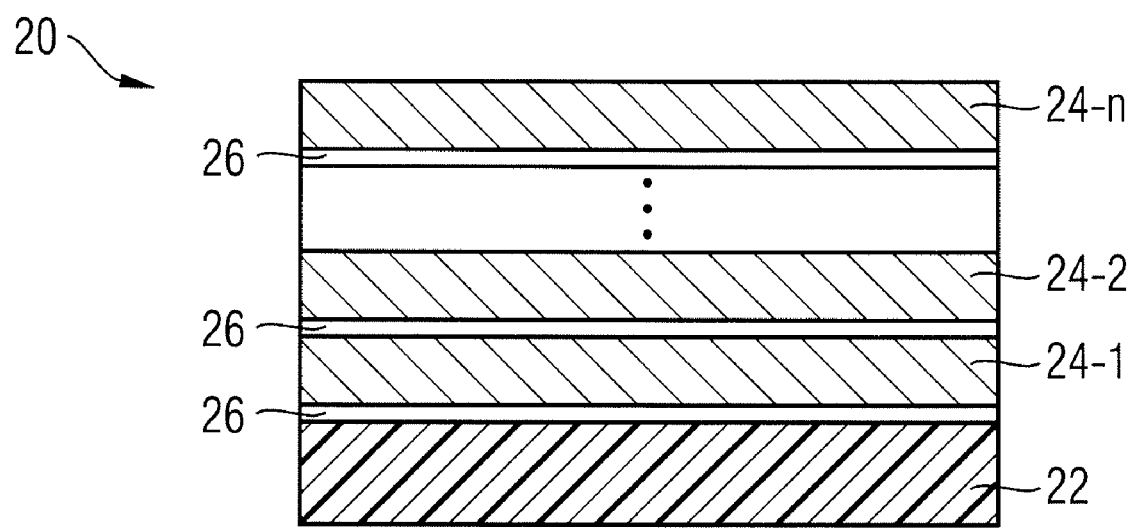
Figure 3:
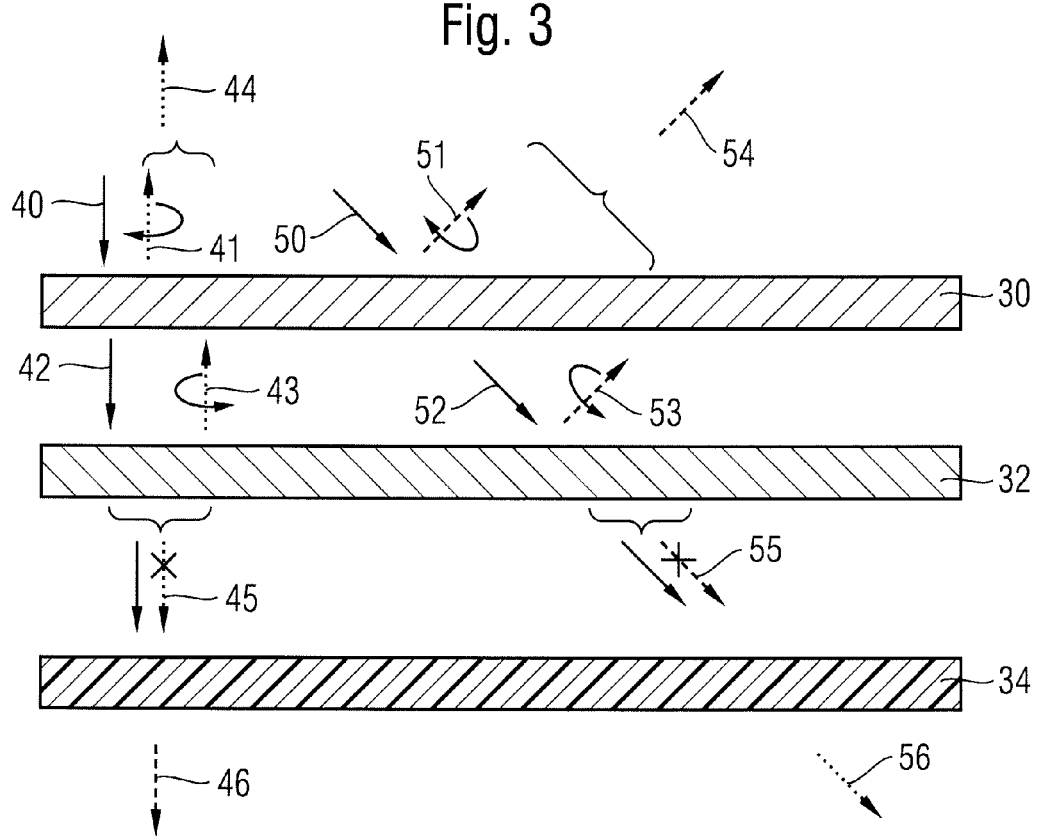
Figure 4A:
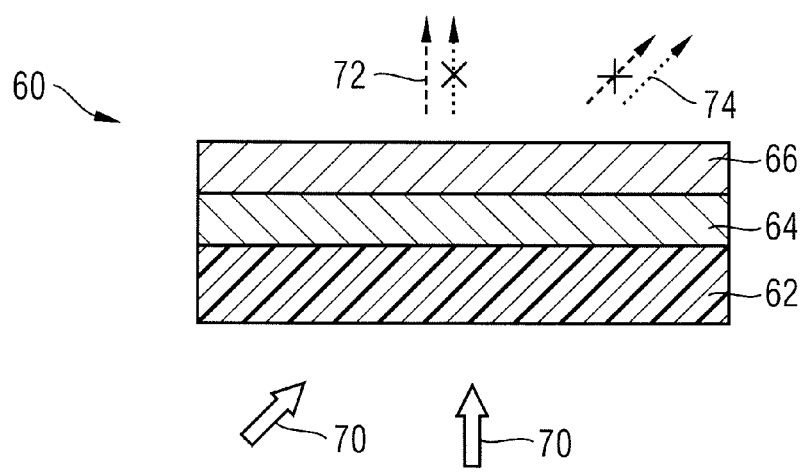
Figure 5A:
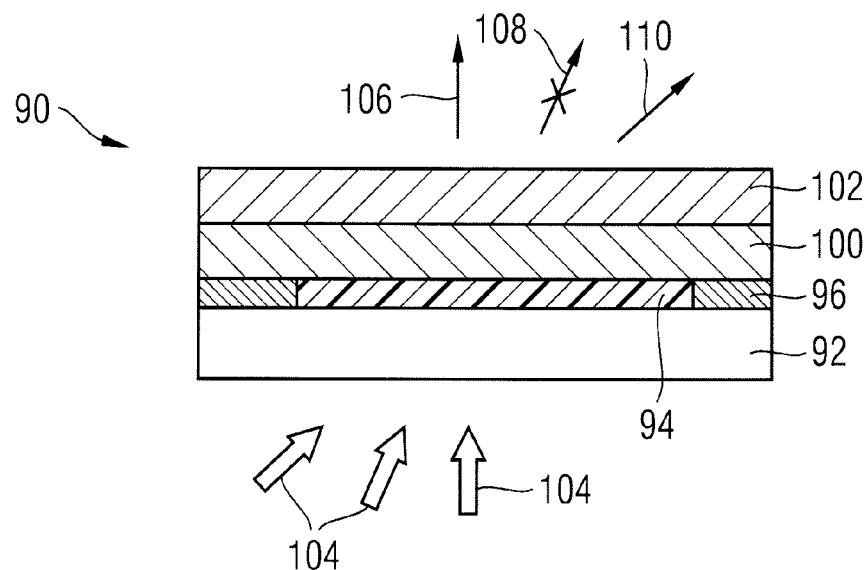
Figure 5B:
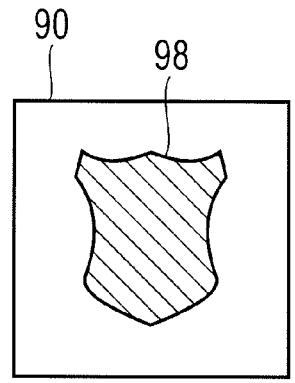
Figure 5C:
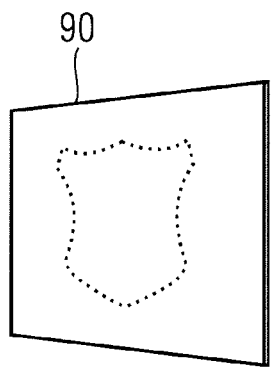
Figure 5D:
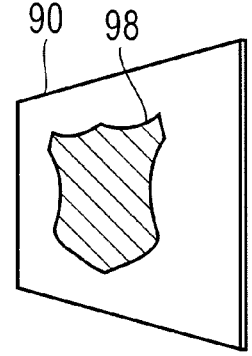
Figure 6:
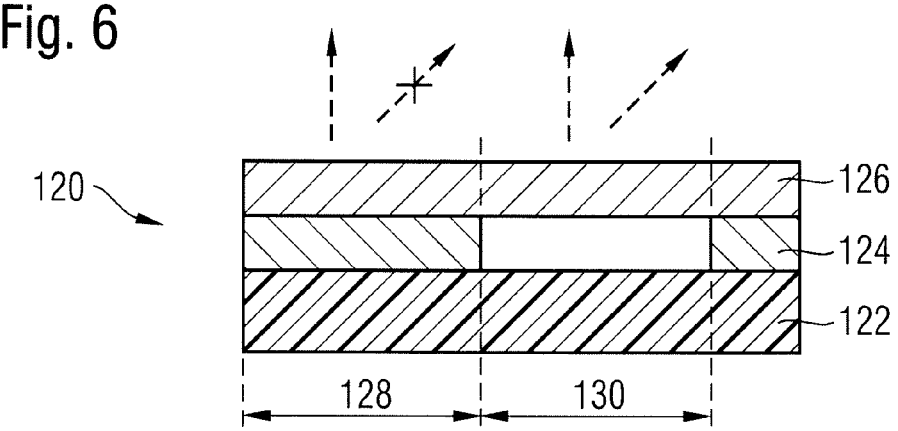
Figure 7:
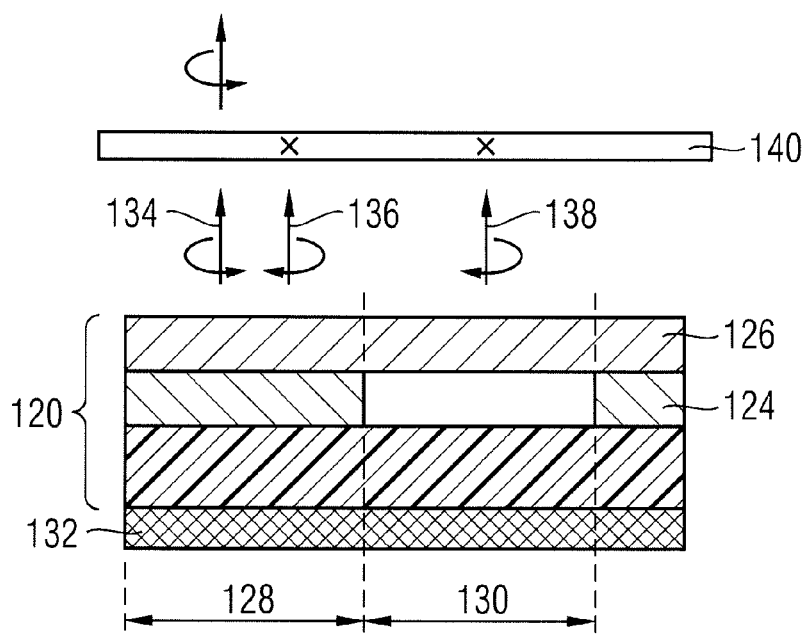
Figure 8:
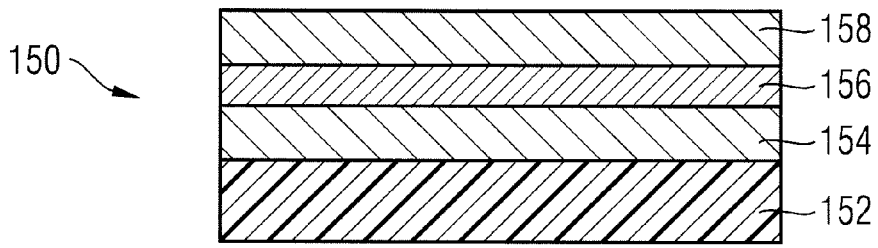

Shown Are:

FIG. 1 a schematic diagram of a banknote having, affixed over a diecut opening, a transfer element according to an exemplary embodiment of the present invention, FIG. 2 the general layer structure of a security element according to the present invention, in cross section, FIG. 3 a principle diagram of a band-stop filter formed from two cholesteric liquid crystal layers and a semi-transparent filter layer, FIG. 4 in (a), a security element according to an exemplary embodiment of the present invention, in cross section, in the left image series (b)-(d), the transmission characteristics of the semi-transparent filter layer, the liquid crystal layers and the total transmission of the security element for vertical viewing, and in the right image series (e)-(g), the corresponding transmission characteristics for viewing at an acute angle, FIG. 5 in (a), the cross section of a security element according to another exemplary embodiment of the present invention, and in (b) to (d), aspects of this security element at different tilt angles, FIG. 6 a security element according to a further exemplary embodiment of the present invention, FIG. 7 the security element in FIG. 6 on a dark background and having a circular polarizer for reading out the encoded piece of information, and FIG. 8 a security element as in FIG. 4(a), in which one of the cholesteric liquid crystal layers is substituted by a combination of a $\lambda/2$ layer and an opposite cholesteric liquid crystal layer.

The invention will now be explained using a banknote as an example. FIG. 1 shows a schematic diagram of a banknote 10 that is provided with an affixed transfer element 12 according to an exemplary embodiment of the present invention. The banknote 10 exhibits a fully diecut opening 14 that, on the front side of the banknote, is completely covered by the transfer element 12. The following exemplary embodiments for inventive security elements can, of course, also be provided on a document comprising plastic, such as a plastic banknote. Here, the transparent opening is preferably formed by an area of the document that is not printed on. In transmitted light, the transfer element 12 displays an inverse color-shift effect in which the color impression of the transfer element changes from a short-wave color impression (blue in the exemplary embodiment) to a longer-wave color impression (green in the exemplary embodiment) when tilted out of the vertical.

FIG. 2 shows the principle layer structure of a security element 20 according to the present invention, such as of the transfer element 12, in cross section. A semi-transparent filter layer 22, for example a colored, smooth PET foil of good surface quality, is provided with two or more, in the general case n, light-polarizing layers 24-1, 24-2, ... 24-n that comprise liquid crystal material and that, in different embodiments, can each exhibit different, or in some cases also the same, light-polarizing properties.

Between two adjacent layers or between the first light-polarizing layer 24-1 and the semi-transparent filter layer 22, alignment layers and/or adhesive layers 26 can be provided that serve to align the liquid crystals in the liquid crystal layers or to join the individual layers and compensate for surface irregularities in the background.

According to the present invention, two of the liquid crystal layers 24-1, 24-2, ... 24-n comprise a cholesteric liquid crystal material and each selectively reflects light having a predetermined direction of circular polarization. Here, they selectively reflect light of a first wavelength range in a first reflection direction and light of a second wavelength range in a second, different reflection direction. In the following exemplary embodiments, it is always assumed that, at vertical light incidence, the liquid crystal layers reflect green light, and at acute-angled light incidence, blue light. It is understood that this color choice is for illustration purposes only and that, in the context of the present invention, liquid crystal layers having other color characteristics can, of course, also be used.

The directions of circular polarization of the light reflected by the two cholesteric liquid crystal layers can be opposite or the same. In the latter case, between the two cholesteric liquid crystal layers is provided a $\lambda/2$ layer that, in the relevant wavelength range, exactly reverses the polarization direction of circularly polarized light. Altogether, the layer sequence comprising the two cholesteric liquid crystal layers and, if applicable, the $\lambda/2$ layer lying therebetween thus reflects light of both directions of circular polarization and therefore acts, in transmission, as a band-stop filter for the respective wavelength range.

The semi-transparent filter layer can comprise a foil colored with dyes that simultaneously serves as the substrate foil for the liquid crystal layers. It can also be formed by a lacquer layer colored with dyes that is imprinted, for example, on a transparent and colorless substrate foil. The substrate foil can be removed following the application of the security element to a value document, for example if the security element covers a transparent, non-through-cut window area of a value document.

The principle of a band-stop filter formed by two cholesteric liquid crystal layers and the semi-transparent filter layer will now be explained in greater detail by reference to the illustration in FIG. 3. FIG. 3 shows two stacked cholesteric liquid crystal layers 30 and 32 and a semi-transparent filter layer 34 that are depicted spaced apart to illustrate the transmitted and reflected light rays. The polarization direction of the light is indicated by additional arrow symbols at the propagation vectors of the light. As usual, a circular polarization in which the circular movement of the electric field intensity vector is clockwise from the perspective of a viewer toward whom the light wave flows is referred to as right-circular polarization, and the opposite polarization as left-circular polarization.

The two liquid crystal layers 30 and 32 are formed such that they exhibit the same selective color reflection spectrum and reflect, for example, green light in the vertical reflection direction and blue light in an acute-angled reflection direction. However, the two liquid crystal layers 30 and 32 differ in the direction of circular polarization of the reflected radiation. While the first liquid crystal layer 30 in the exemplary embodiment reflects right-circularly polarized light, the second liquid crystal layer 32 reflects left-circularly polarized light of the appropriate wavelength. The opposite polarization direction in each case, as well as light having wavelengths outside of the range of selective reflection, are transmitted by the liquid crystal layers without significant absorption. The semi-transparent filter layer is colored with dyes such that, in the visible spectral range, it is transmissive only to blue and green light and absorbs longer-wave light.

If the layer sequence 30, 32, 34 is irradiated with white light 40, 50, then the following picture results for the transmitted and reflected radiation: Of the vertically incident white light 40, the right-circularly polarized green portion 41 is reflected by the first liquid crystal layer 30, and the left-circularly polarized green portion and all other wavelengths are transmitted. Of the transmitted radiation 42, the second liquid crystal layer 32 then reflects the left-circularly polarized green portion 43 of the light and transmits light of the other wavelengths. The green spectral portion 44 of the white light is thus substantially completely reflected by the layer sequence 30, 32, since both of its directions of circular polarization are reflected. Of the radiation 45 remaining after the two liquid crystal layers, which constitutes white light without the green spectral portion 44, the semi-transparent filter layer 34 now transmits merely the blue portion 46. The other wavelengths of the white light are absorbed.

For the white light 50 incident at an acute angle, the reflected wavelength range shifts due to the physical properties in the shorter-wave range, in the exemplary embodiment from green to blue light. Accordingly, the first liquid crystal layer 30 reflects the right-circularly polarized blue light portion 51, while the left-circularly polarized blue portion and the other wavelengths are transmitted. Of the transmitted radiation 52, the second liquid crystal layer 32 reflects the left-circularly polarized blue portion 53 of the light and transmits light of the other wavelengths. Thus, in the acute-angled direction, the blue spectral portion 54 of the white light is completely reflected by the layer sequence 30, 32. Of the radiation 55 remaining after the two liquid crystal layers, the semi-transparent filter layer 34 now transmits merely the green portion 56, and the other wavelengths of the white light are absorbed.

In transmitted light, the layer sequence 30, 32, 34 thus shows, overall, a reversed color-shift effect in which the color impression for the viewer changes from short-wave blue 46 when viewed vertically to longer-wave green 56 when viewed from an acute angle. As immediately apparent, the described transmitted-light color-shift effect occurs independently of whether the illumination takes place from above, that is, from the side of the liquid crystal layers 30, 32, or from below, that is, from the side of the semi-transparent filter layer 34.

FIG. 4(a) shows, according to an exemplary embodiment of the present invention, a security element 60 that exploits the principle described. On a semi-transparent foil 62 colored with dyes are applied two cholesteric liquid crystal layers 64 and 66 that exhibit the same light-polarizing properties as the above-described liquid crystal layers 32 and 30, that is, reflect, in the vertical reflection direction, green light, and in an acute-angled reflection direction, blue light, each of opposite circular polarization. When the security element 60 is illuminated from behind, such as occurs, for example, when viewed against daylight 70, the security element transmits, as explained in connection with FIG. 3, in the vertical direction, only the blue portion 72 of the daylight, while when viewed from an acute angle, only the green portion 74 appears. The viewer thus observes, when the security element 60 is tilted, a reversed transmitted-light color-shift effect.

Figure 4B:
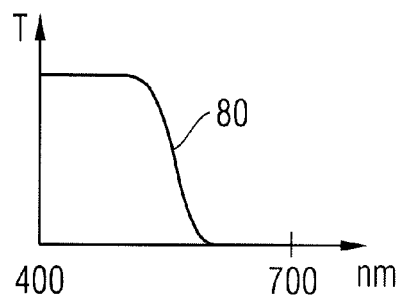
Figure 4E:
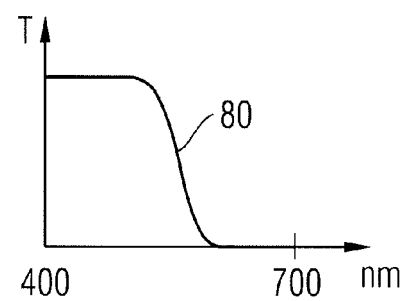
Figure 4C:
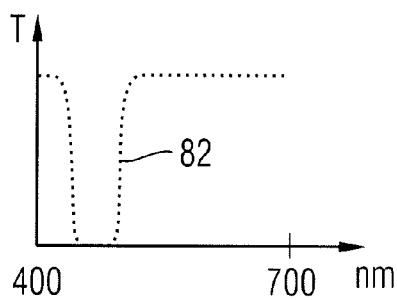
Figure 4F:
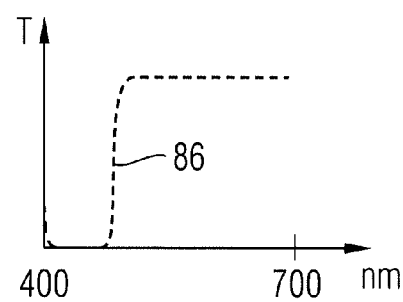
Figure 4D:
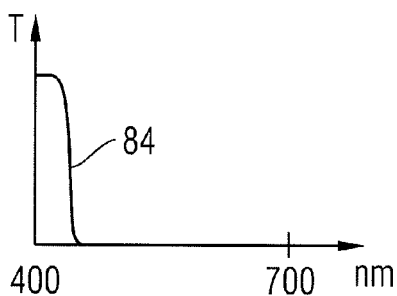
Figure 4G:
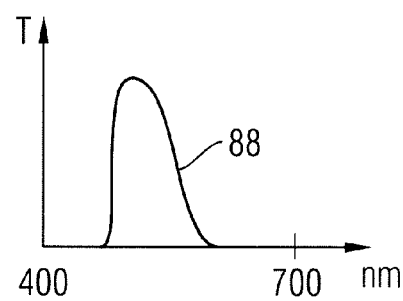

FIGS. 4(b) to 4(g) show the transmission characteristics of the semi-transparent filter layer 62, of the liquid crystal layers 64, 66 and the total transmission of the security element 60 for vertical viewing (left image series, FIGS. 4(b) to (d)) and for viewing at an acute angle (right image series, FIGS. 4(e) to (g)).

As the transmission characteristic 80 depicted in FIG. 4(b) and (e) shows, in the visible spectral range, the colored foil 62 transmits only blue and green light and absorbs longer-wave light. When viewed vertically, the cholesteric liquid crystal layers 64, 66 act as a band-stop filter for green light, as shown by the transmission curve 82. The combination of the two curves 80 and 82 yields the total vertical transmission 84 of the security element 60, which, as described above, exhibits an appreciable value merely in blue.

When viewed at an acute angle, the cholesteric liquid crystal layers 64, 66 form a band-stop filter for blue light, as indicated by the transmission curve 86. Again, the total transmission 88 results from the combination of the curves 80 and 86 and shows, as expected, a transmission peak in the green spectral range.

A further exemplary embodiment of the present invention is depicted in FIG. 5(a). The security element 90 exhibits a transparent substrate foil 92 on which, in sub-areas, a lacquer layer 94 colored with dyes is imprinted. In other areas, the substrate foil is provided with a dark background layer 96. Here, by their shape or outline, the areas covered by the lacquer layer 94 form a motif, in the exemplary embodiment a crest 98.

To the lacquer layer 94 or the dark background layer 96 are applied two cholesteric liquid crystal layers 100 and 102 that selectively reflect, in the vertical reflection direction, light of a first wavelength range, in a second reflection direction having a medium polar angle, light of a second, shorter-wave wavelength range, and in a third, acute-angled reflection direction, light of a third, shortest-wave wavelength range.

In this exemplary embodiment, the lacquer layer 94 that acts as a semi-transparent filter layer is provided with two dyes that absorb light of the first and third wavelength range such that substantially only light of the second, middle wavelength range is transmitted.

When the security element 90 is illuminated from behind (reference number 104), in transmitted light, the following image results for the viewer: When viewed vertically 106, the crest 98 appears clearly for the viewer, as shown in FIG. 5 (b). In this viewing direction, the liquid crystal layers 100 and 102 reflect light from the first wavelength range and thus transmit light of the second and third wavelength range. However, since light of the third wavelength range is absorbed by the semi-transparent filter layer 94 and said layer is thus transmissive merely to light from the second wavelength range, only the latter reaches the viewer through the liquid crystal layers 100, 102. The area of the security element provided with the background layer 96, in contrast, remains dark such that the crest motif 98 lights up in clear contrast.

If the viewer now tilts the security element 90 out of the vertical such that the incident light 104 falls onto the liquid crystal layers (reference number 108) at the second reflection direction, then the crest 98 disappears, as indicated in FIG. 5(c). In this viewing direction, namely, the liquid crystal layers 100, 102 reflect the light from the second wavelength range transmitted by the semi-transparent filter layer 94. The areas of the security element provided with the semi-transparent filter layer 94 and the dark background layer 96 are thus equally opaque such that the crest motif is not perceptible for the viewer.

When the security element 90 is tilted further (reference number 110), the motif 98 appears again, as shown in FIG. 5(d) since, at the more acute angle of incidence, the liquid crystal layers 100,102 selectively reflect only light of the third wavelength range and are thus, just like the semi-transparent filter layer 94, transmissive for light from the second wavelength range.

The security element 120 of the further exemplary embodiment in FIG. 6 includes a semi-transparent filter layer 122 to which a first and second cholesteric liquid crystal layer 124 and 126 are applied that are to again exhibit the same light-polarizing properties as the liquid crystal layers 32 and 30. In the exemplary embodiment, the first cholesteric liquid crystal layer 124 is applied only in some areas in the form of a motif, for example a lettering. In the exemplary embodiment, the transmission characteristic of the semi-transparent filter layer 122 is chosen such that only blue light is transmitted and longer-wave green and red light, in contrast, is absorbed.

Thus, in transmitted light, the areas 128 of the security element 120 covered by both liquid crystal layers 124 and 126 appear blue when viewed vertically, and dark, in contrast, at an acute viewing angle, since the blue light transmitted by the semi-transparent filter layer 122 is completely blocked out in this direction by the liquid crystal layers 124,126.

However, in the gap area 130 without first liquid crystal layer, the blue light also appears at an acute viewing angle, since only one of the two directions of circular polarization of the blue light is then reflected by the second liquid crystal layer 126. Overall, the uniform blue appearance of the security element 120 in transmitted light when tilted out of the vertical changes into a motif representation in the shape of the areas 130 left uncovered by the second liquid crystal layer.

The security element 120 in FIG. 6 permits yet a further visualization of the encoded motif, which will now be explained with reference to FIG. 7. For this check method, the security element 120 is laid on a dark, absorbent background layer 132 to block out the transmitted light, and viewed in reflection with illumination from the front. Such a background layer can be provided, for example, by a separate display element that, just like the security element 120, is present on a value document, e.g. a banknote, for self-authentication.

If the security element 120 is viewed without auxiliary means, primarily the color-shift effect of the second liquid crystal layer 126 appears. In the uncovered areas 130, the motif is perceptible in each case with the same color impression, but a reduced brightness compared with its surroundings since, in the overlap area 128, light of both directions of circular polarization 134, 136 is reflected, while in the uncovered areas 130, only light of one direction of circular polarization is reflected, in the exemplary embodiment right-circularly polarized light 138.

If the security element 120 is now viewed through a circular polarizer 140 that transmits only left-circularly polarized light, then the motif formed by the first liquid crystal layer 124 stands out with a clear brightness contrast, since the circular polarizer 140 completely blocks out the right-circularly polarized light reflected by the second liquid crystal layer 126. Such a circular polarizer 140 can be formed, for example, by a linear polarizer and a following λA/4 plate. Furthermore, just like the security element 120 and, if applicable, the dark background layer, it can be provided as a separate display element that is present on the value document for self-authentication.

In all of the exemplary embodiments described, one of the two cholesteric liquid crystal layers can be substituted by a combination of a λ/2 layer and an oppositely oriented cholesteric liquid crystal layer. This is explained by way of example for the exemplary embodiment in FIG. 4(a).

FIG. 8 shows a security element 150 in which the second liquid crystal layer 66 in FIG. 4(a) is substituted by a combination of a λ/2 layer 156 and a cholesteric liquid crystal layer 158 oriented oppositely to the liquid crystal layer 66, i.e. oriented identically to the liquid same crystal layer 154. The liquid crystal layer sequence disposed on the semi-transparent filter layer 152 thus includes two cholesteric liquid crystal layers 154 and 158 having the same light-polarizing properties such that the two layers in themselves each reflects light of the same circular polarization.

The λ/2 layer 156 disposed between the two cholesteric liquid crystal layers 154 and 158 is formed from nematic liquid crystal material. The effect of the λ/2 layer 156 and the second cholesteric liquid crystal layer 158 taken together corresponds exactly to the effect of the second cholesteric liquid crystal layer 66. In the wavelength range relevant in each case, the right-circularly polarized portion of the light transmitted by the first liquid crystal layer 154 namely is converted by the λ/2 layer 156 into left-circularly polarized light and reflected by the second liquid crystal layer 158. The reflected light is then converted back into right-circularly polarized light by the λ/2 layer 156 and transmitted by the first liquid crystal layer 154.

The security element 150 in FIG. 8 thus exhibits the same reflection and transmission properties as the security element 60 in FIG. 4(a). Due to the additional λ/2 layer 156, new variation possibilities result, for example, motif apertures can be introduced merely into the λ/2 layer and not into the cholesteric liquid crystal layers 154,158. The λ/2 layer can also comprise two λ/4 sub-layers that can be twisted toward one another in the layer plane to weaken the light-polarizing effect locally. Through a different angle of rotation in different surface areas of such an intermediate layer comprising two λ/4 sub-layers, it is possible, for example, to encode in the security element halftone motifs that appear as grayscale images both when viewed in transmitted light and when viewed through a circular polarizer.

The invention claimed is:

1. A security element for securing value documents, having
   a first light polarizing layer that is present at least in some areas and comprises a cholesteric liquid crystal material, that selectively reflects light having a predetermined circular polarization, and that selectively reflects light of a first wavelength range in a first reflection direction and light of a second wavelength range in a second, different reflection direction,
   a second light polarizing layer that is present at least in some areas and that selectively reflects light having the opposite circular polarization to the predetermined circular polarization, and that selectively reflects light of the first and second wavelength range in the first and second reflection direction, respectively, and
   a semi-transparent filter layer on which the first and second light polarizing layer are stacked, the filter layer at least partially absorbing light from the visible spectral range and transmitting light from at least one of the first and second wavelength range.

2. The security element according to claim 1, characterized in that the second light polarizing layer is formed from a cholesteric liquid crystal material, and selectively reflects light having the opposite circular polarization to the predetermined circular polarization.

3. The security element according to claim 1, characterized in that the second light polarizing layer is formed from two sub-layers, a first sub-layer being formed from a cholesteric liquid crystal material and selectively reflecting light having the predetermined circular polarization, and a second sub-layer disposed between the first sub-layer and the first light polarizing layer forming a λ/2 layer.

4. The security element according to claim 3, characterized in that the λ/2 layer is formed from nematic liquid crystal material.

5. The security element according to claim 3, characterized in that the λ/2 layer is formed from multiple sub-layers that are stacked and, in some areas, twisted toward one another in the layer plane.

6. The security element according to claim 5, characterized in that the multiple sub-layers are formed by two λ/4 layers.

7. The security element according to claim 1, characterized in that the first and second light polarizing layer selectively reflect light of a third wavelength range in a third reflection direction, and the semi-transparent filter layer at least partially absorbs light from the visible spectral range and transmits light from at least one of the first, second, and third wavelength range.

8. The security element according to claim 1, characterized in that the first and second light polarizing layer reflect light from the visible spectral range in all reflection directions.

9. The security element according to claim 1, characterized in that the first and second light polarizing layer reflect light from the non-visible spectral range in at least one of the reflection directions.

10. The security element according to claim 1, characterized in that the first and second reflection directions are separated by a polar angle of 20° or more with respect to a surface normal to the light polarizing layers.

11. The security element according to claim 1, characterized in that the first and second reflection direction are separated by a polar angle of 40° or more with respect to a surface normal to the light polarizing layers.

12. The security element according to claim 1, characterized in that at least one of the first and the second light-polarizing layer is present in the form of characters patterns.

13. The security element according to claim 1, characterized in that further light-polarizing layers comprising nematic or cholesteric liquid crystal material are provided.

14. The security element according to claim 1, characterized in that at least one of the light-polarizing layers comprising cholesteric liquid crystal material is present in the form of pigments that are embedded in a binder matrix.

15. The security element according to claim 14, characterized in that the first and second light-polarizing layer, which reflect light of opposing circular polarization, are formed from cholesteric liquid crystal material and are present in the form of pigments, a mixture of equal parts of pigments of the first and second light-polarizing layer being embedded in a binder matrix.

16. The security element according to claim 1, characterized in that the semi-transparent filter layer transmits light between the first and second wavelength range and absorbs visible light outside of these wavelength ranges.

17. The security element according to claim 1, characterized in that the semi-transparent filter layer transmits only light of at least one of the first, second, and third wavelength range and absorbs visible light outside of at least one of the first, second, and third wavelength range.

18. The security element according to claim 1, characterized in that the semi-transparent filter layer is formed by a lacquer layer or foil colored with one or more dyes.

19. The security element according to claim 1, characterized in that the semi-transparent filter layer is present in the form of at least one of characters and patterns.

20. The security element according to claim 1, characterized in that the light-polarizing layers and the semi-transparent filter layer are present on a substrate.

21. The security element according to claim 1, characterized in that at least one of alignment layers and adhesive layers intended to align liquid crystal layers are present between at least one of: (a) adjacent light-polarizing layers, and (b) a light-polarizing layer and the semi-transparent filter layer.

22. The security element according to claim 1, characterized in that the security element forms a label or a transfer element.

23. A method for manufacturing a security element according to claim 1, comprising:
   providing a first light-polarizing layer comprising a cholesteric liquid crystal material;
   providing a second light-polarizing layer that includes at least one layer comprising a cholesteric liquid crystal material;
   providing a semi-transparent filter layer; and
   stacking the first light-polarizing layer and the second light-polarizing layer on the semi transparent filter layer.

24. The method according to claim 23, characterized in that one or more of the liquid crystal layers are applied to, or imprinted on, a substrate foil.

25. The method according to claim 24, characterized in that, following the application to the substrate foil, the liquid crystal layers are checked for suitability for further processing.

26. The method according to claim 23, characterized in that two or more liquid crystal layers are applied stacked on the same substrate foil.

27. The method according to claim 23, characterized in that the liquid crystal layers present on a substrate foil are laminated onto the semi-transparent filter layer or a further liquid crystal layer.

28. The method according to claim 27, characterized in that, following lamination, the substrate foil is removed, via separation layers or by using a laminating adhesive whose adhesion to the substrate foil is less than its adhesion to the liquid crystal layer, or via an auxiliary layer that is applied to the entire surface of the liquid crystal layer and whose adhesion to the substrate foil is less than its adhesion to the liquid crystal layer.

29. The method according to claim 28, characterized in that the auxiliary layer is formed by a UV lacquer layer.

30. The method according to claim 23, characterized in that the cholesteric liquid crystal layers are formed by combining a nematic liquid crystal system with a twister.

31. The method according to claim 30, characterized in that a first and a second cholesteric liquid crystal layer reflecting light of opposite direction of circular polarization are formed by combining a nematic liquid crystal system with coordinated first and second twisters such that the liquid crystals of the first and second layer arrange themselves into mirror-image helix structures.

32. The method according to claim 23, characterized in that the $\lambda/2$ sub-layer of the second light-polarizing layer is formed from nematic liquid crystal material.

33. A security arrangement, having
the security element according to claim 1; and
a separate display element that, in coaction with the security element, makes at least one of a color shift effect and a polarization effect perceptible for the viewer.

34. The security arrangement according to claim 33, characterized in that the display element comprises a dark or black background.

35. The security arrangement according to claim 34, characterized in that the background is present in the form of at least one of characters and patterns.

36. The security arrangement according to claim 33, characterized in that the display element further comprises a linear or circular polarizer.

37. A value document, such as a banknote, check, certificate, or identification card, having the security element according to claim 1.

38. A value document, such as a banknote, check, certificate, or identification card, having the security arrangement according to claim 33.

39. The value document according to claim 37, characterized in that the security element is disposed in a window area of the value document.

40. The value document according to claim 38, characterized in that the value document is flexible such that the security element and the display element are layable one on top of another by bending or folding the value document for self-authentication.

41. The security element according to claim 1, characterized in that the light-polarizing layers and the semi-transparent filter layer are present on a substrate, wherein the substrate is formed from paper or plastic.

42. A method for checking the authenticity of the security element according to claim 1, comprising
checking the security element in transmitted light for whether a predetermined color shift effect is present, thereby providing a check result; and
assessing the authenticity of the checked security element on the basis of the check result.

43. A method for checking the authenticity of a value document having the security element according to claim 1, comprising
checking the security element in transmitted light for whether a predetermined color shift effect is present, thereby providing a check result; and
assessing the authenticity of the value document having the checked security element on the basis of the check result.

44. A method for checking the authenticity of the security element according to claim 1, comprising
laying the security element on a dark background;
reading a piece of information encoded in the security element with the aid of a circular polarizer, thereby providing a read result; and
assessing the authenticity of the element on the basis of the read result.

45. A method for checking the authenticity of a value document having the security element according to claim 1, comprising
laying the security element on a dark background;
reading a piece of information encoded in the security element with the aid of a circular polarizer, thereby providing a read result; and
assessing the authenticity of the value document on the basis of the security element read result.

46. A method of securing a valuable article, such as a branded article or a value document, comprising
providing the valuable article with the security element according to claim 1.

47. A method of securing a valuable article, such as a branded article or a value document, comprising
providing the valuable article with the security arrangement according to claim 33.

* * * * *